US012650717B2

(12) United States Patent
Huang et al.

(10) Patent No.: US 12,650,717 B2
(45) Date of Patent: Jun. 9, 2026

(54) INFORMATION HANDLING SYSTEM CARD MOUNTING SYSTEM

(71) Applicant: Dell Products L.P., Round Rock, TX (US)

(72) Inventors: Chien-Tung Huang, New Taipei City (TW); Shan-Yi Chang, Taoyuan City (TW); Kuang-Jye Tuan, Taipei (TW)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 18/203,088

(22) Filed: May 30, 2023

(65) Prior Publication Data

US 2024/0402771 A1 Dec. 5, 2024

(51) Int. Cl.
G06F 1/186 (2026.01)
(52) U.S. Cl.
CPC .................................... G06F 1/186 (2013.01)
(58) Field of Classification Search
CPC ....... G06F 1/185; G06F 1/186; H05K 7/1404; H05K 7/1408
See application file for complete search history.

(56) References Cited

U.S. PATENT DOCUMENTS 7,359,216 B2 * 4/2008 Hall ........................ G06F 1/185
361/752
11,262,812 B2 * 3/2022 Chen ...................... G06F 1/186

* cited by examiner

*Primary Examiner* — James Wu
(74) *Attorney, Agent, or Firm* — Terrile, Cannatti & Chambers, LLP; Stephen A. Terrile

(57) ABSTRACT

A system and method for performing a card retention operation. The card retention operation is performed by a card mounting system which includes a card bay and a card retention component coupled to the card bay, the card retention component include a vertical structural component; a slot feature coupled with the vertical structural component, the slot feature being configured to mate with a projection extending from a card conforming to a first card form factor; and, a side latch feature coupled with the vertical structural component, the side latch feature being configured to provide horizontal pressure against a card conforming to a second card form factor where the slot feature and the side latch feature enable the card retention component to retain cards conforming to the plurality of different card form factors within a single card bay.

18 Claims, 17 Drawing Sheets

INFORMATION HANDLING SYSTEM CARD MOUNTING SYSTEM

BACKGROUND OF THE INVENTION

Field of the Invention

The present invention relates to information handling systems. More specifically, embodiments of the invention relate to a card mounting system for use in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium for performing a card retention operation.

More specifically, in one embodiment the invention relates to a card retention component, comprising: a vertical structural component; a slot feature coupled with the vertical structural component, the slot feature being configured to mate with a projection extending from a card conforming to a first card form factor; and, a side latch feature coupled with the vertical structural component, the side latch feature being configured to provide horizontal pressure against a card conforming to a second card form factor; and wherein the slot feature and the side latch feature enable the card retention component to retain cards conforming to the plurality of different card form factors within a single card bay.

In another embodiment the invention relates to a card mounting system, comprising: a card bay; and, a card retention component coupled to the card bay, the card retention component comprising a vertical structural component; a slot feature coupled with the vertical structural component, the slot feature being configured to mate with a projection extending from a card conforming to a first card form factor; and, a side latch feature coupled with the vertical structural component, the side latch feature being configured to provide horizontal pressure against a card conforming to a second card form factor; and wherein the slot feature and the side latch feature enable the card retention component to retain cards conforming to the plurality of different card form factors within a single card bay.

In another embodiment the invention relates to a system comprising: a processor; a data bus coupled to the processor; and a card mounting system, the card mounting system comprising a card bay and a card retention component coupled to the card bay, the card retention component comprising a vertical structural component; a slot feature coupled with the vertical structural component, the slot feature being configured to mate with a projection extending from a card conforming to a first card form factor; and, a side latch feature coupled with the vertical structural component, the side latch feature being configured to provide horizontal pressure against a card conforming to a second card form factor; and wherein the slot feature and the side latch feature enable the card retention component to retain cards conforming to the plurality of different card form factors within a single card bay.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
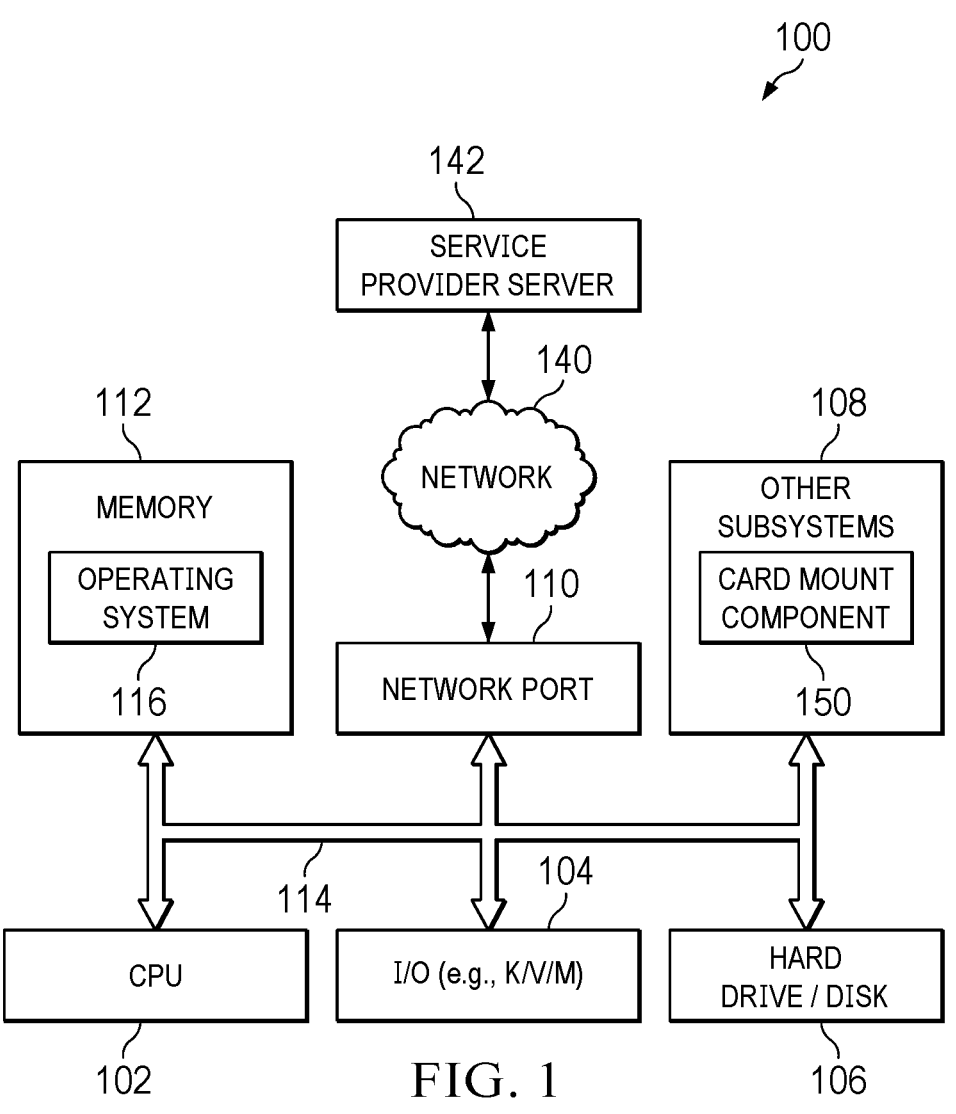
FIG. 1 shows a general illustration of components of an information handling system as implemented in the system and method of the present invention.

Certain aspects of the disclosure reflect an appreciation that it can be challenging to design an information handing system which passes shock and vibration testing, fulfills military specification requirements and network equipment building system (NEBS) specification requirements. Certain aspects of the disclosure include an appreciation that the information handling system card holder design is an important element to passing shock and vibration testing and fulfilling one or both military specification requirements and NEBS specification requirements.

Certain aspects of the disclosure reflect an appreciation that designing an information handling system card holder can be challenging when a requirement of the design is that different card form factors be accommodated by the card holder. Certain aspects of the disclosure reflect an appreciation that it would be desirable to provide a card holder which can accommodate cards conforming to a plurality of card form factors. Certain aspects of the disclosure reflect an appreciation that the different form factors can include a peripheral component interconnect express (PCIe) form factor and a low profile graphics processing unit (GPU) form factor. Certain aspects of the disclosure reflect an appreciation that an example low profile GPU form factor includes an A2 low profile GPU card available from NVIDIA.

Certain aspects of the disclosure reflect an appreciation that the different form factors can include different defined keep out areas. As used herein, a keep out area refers to a zone within the information handling system that cannot be used due to one or more card constraints such as thermal management component constraints, cooling constraints, mounting constraints or a combination thereof. Certain aspects of the disclosure reflect an appreciation that information handling system card holders often use the rest area of card keep out (i.e., the area outside the keep out area defined by the PCIe specification). Since the keep out area of A2 card is different than standard PCIe cards, it requires a different card holder customized for A2, or additional part may be required.

A system and method are disclosed for performing an information handling system card retention operation. In certain embodiments, the information handling system card retention operation retains information handling system cards conforming to a plurality of different card form factor within a single card holder. In certain embodiments, the card holder comprises a riser cage. In certain embodiments, the information handling system card retention operation retains information handling system cards conforming to a plurality of different card form factor using a single card retention component, thus performing the operation without a need for different parts for the different form factors.

In certain embodiments, the information handling system card retention operation uses a card mount component to retain information handling system cards conforming to a plurality of different card form factor within a single card holder. In certain embodiments, the different form factors include a peripheral component interconnect express (PCIe) form factor and a low profile graphics processing unit (GPU) form factor. In certain embodiments, an example low profile GPU form factor includes an A2 low profile GPU card available from NVIDIA. In certain embodiments, the card mount component performs a card retention function, a cable management function, or a combination thereof. In certain embodiments, the card mount component secures installed cards within the card holder to meet military and NEBS specification requirements. In certain embodiments, the card mount component provides future support for additional low profile GPU form factors such as the L4 card form factor available from NVIDIA.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a card mount system 150.

The card mount system 150 performs an information handling system card retention operation. In certain embodiments, the information handling system card retention operation retains information handling system cards conforming to a plurality of different card form factor within a single card holder. In certain embodiments, the card holder comprises a riser cage. In certain embodiments, the information handling system card retention operation retains information handling system cards conforming to a plurality of different card form factor using a single card retention component, thus performing the operation without a need for different parts for the different form factors.

In certain embodiments, the information handling system card retention operation uses the card mount system 150 to retain information handling system cards conforming to a plurality of different card form factor within a single card holder. In certain embodiments, the different form factors include a peripheral component interconnect express (PCIe) form factor and a low profile graphics processing unit (GPU) form factor. In certain embodiments, an example low profile GPU form factor includes an A2 low profile GPU card available from NVIDIA. In certain embodiments, the card mount system 150 performs a card retention function, a cable management function, or a combination thereof. In certain embodiments, the card mount system 150 secures installed cards within the card holder to meet military and NEBS specification requirements. In certain embodiments, the card mount system 150 provides future support for additional low profile GPU form factors such as the L4 card form factor available from NVIDIA.

Figure 2:
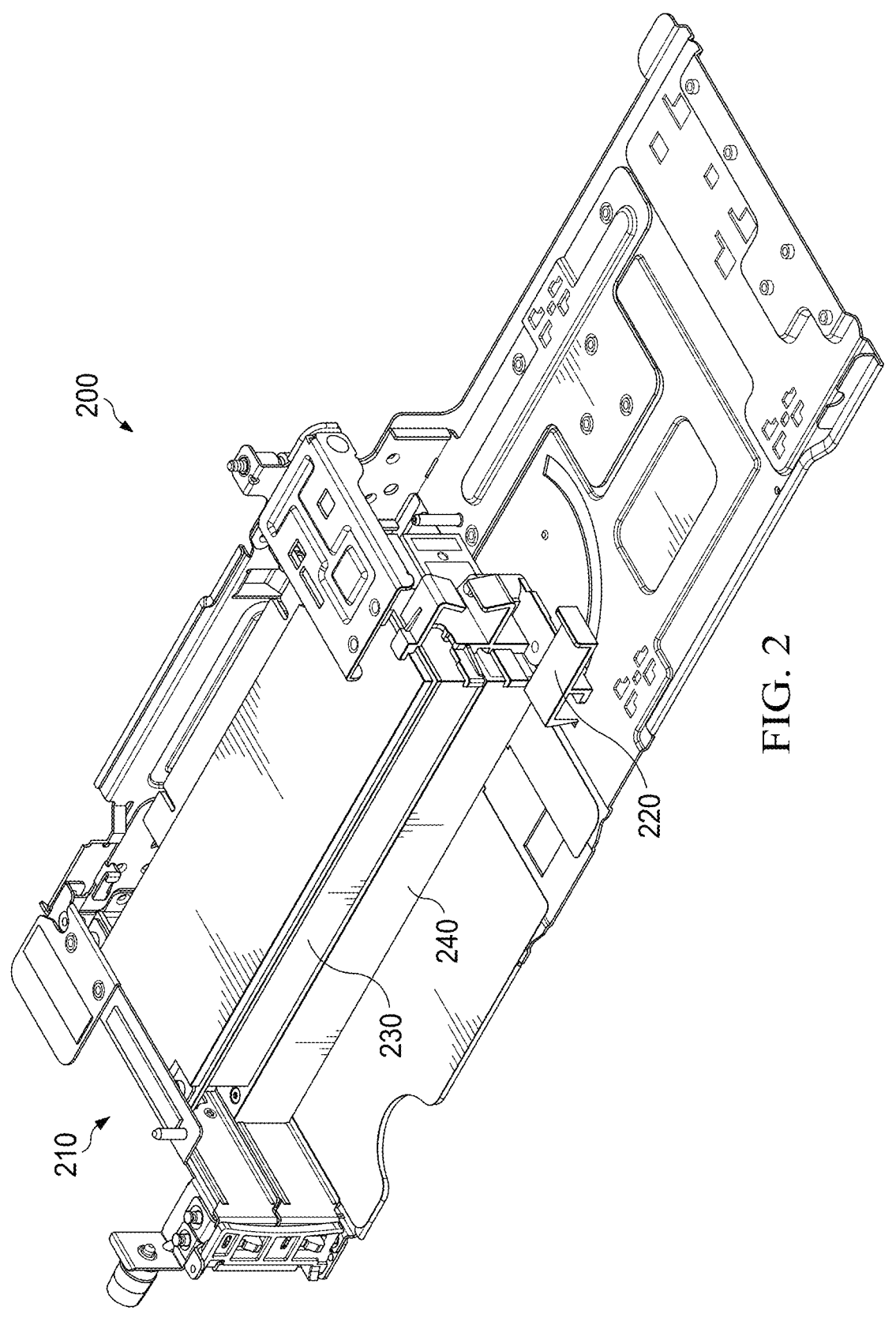
FIG. 2 shows a perspective view of a card mounting system in accordance with the present disclosure.

FIG. 2 shows a perspective view of a card mounting system 200. In certain embodiments, the card mounting system 200 includes a card bay 210, a card retention component 220 or a combination thereof. In certain embodiments the card mounting system 200 is included within an information handling system such as information handling system 100. In certain embodiments, the card mounting system 200 corresponds to card mounting system 150.

The card mount system 200 performs an information handling system card retention operation. In certain embodiments, the information handling system card retention operation retains information handling system cards 230, 240 conforming to a plurality of different card form factor within a single card bay 210. In certain embodiments, the card bay 210 comprises a riser cage. In certain embodiments, the information handling system card retention operation retains information handling system cards conforming to a plurality of different card form factor using a single card retention component 220, thus performing the operation without a need for different parts for the different form factors.

In certain embodiments, the information handling system card retention operation uses the card mount component 220 to retain information handling system cards 230, 240 conforming to a plurality of different card form factor within a single card bay 210. In certain embodiments, the different form factors include a peripheral component interconnect express (PCIe) form factor and a low profile graphics processing unit (GPU) form factor. In certain embodiments, an example low profile GPU form factor includes an A2 low profile GPU card available from NVIDIA. In certain embodiments, the card mount component 220 performs a card retention function, a cable management function, or a combination thereof. In certain embodiments, the card mount component 220 secures installed cards 230, 240 within the card holder to meet military and NEBS specification requirements. In certain embodiments, the card mount component 220 provides future support for additional low profile GPU form factors such as the L4 card form factor available from NVIDIA.

Figure 3A:
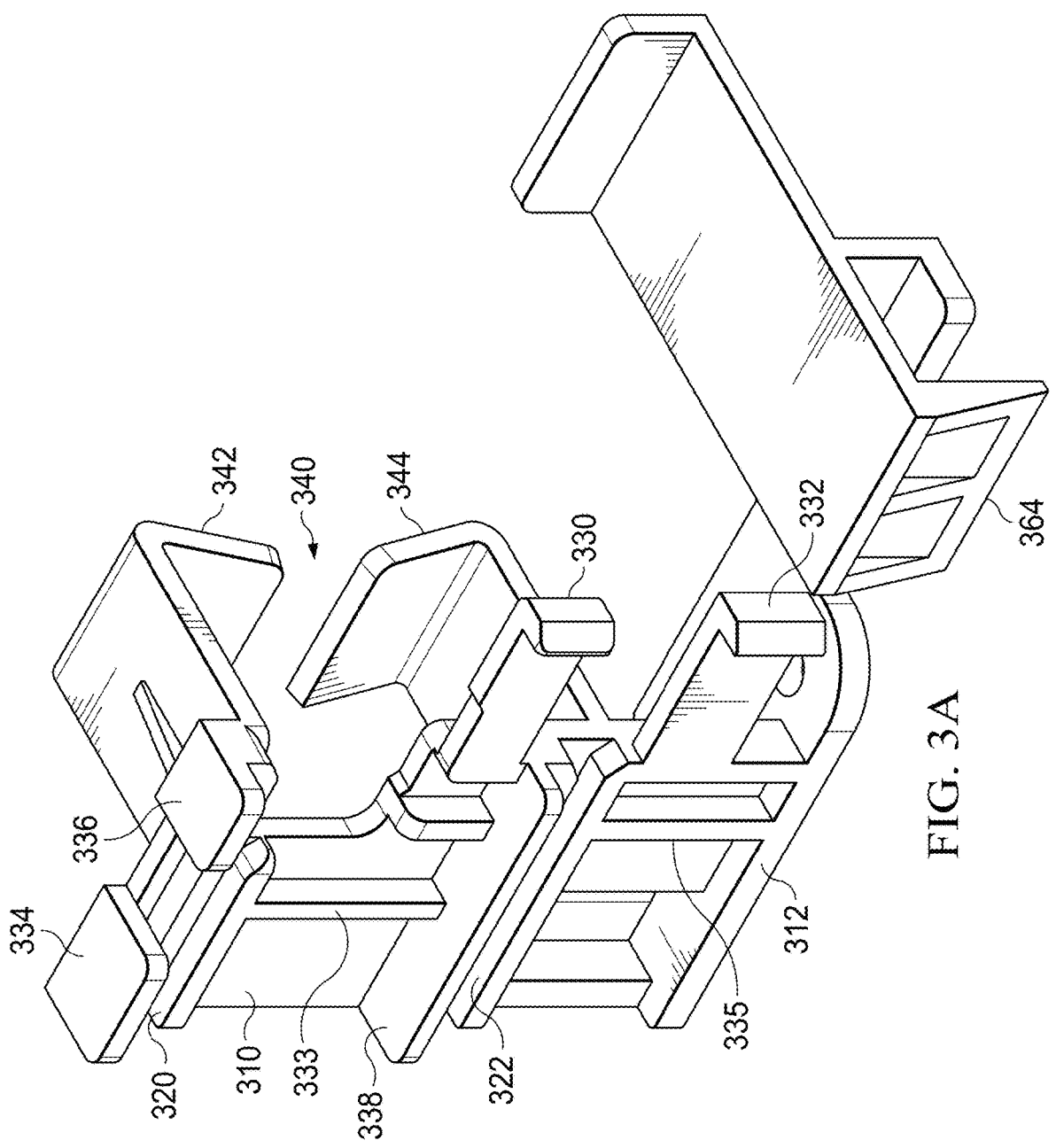
FIG. 3A, generally referred to as FIG. 3, shows a top side perspective view of a card retention component in accordance with the present disclosure.
Figure 3B:
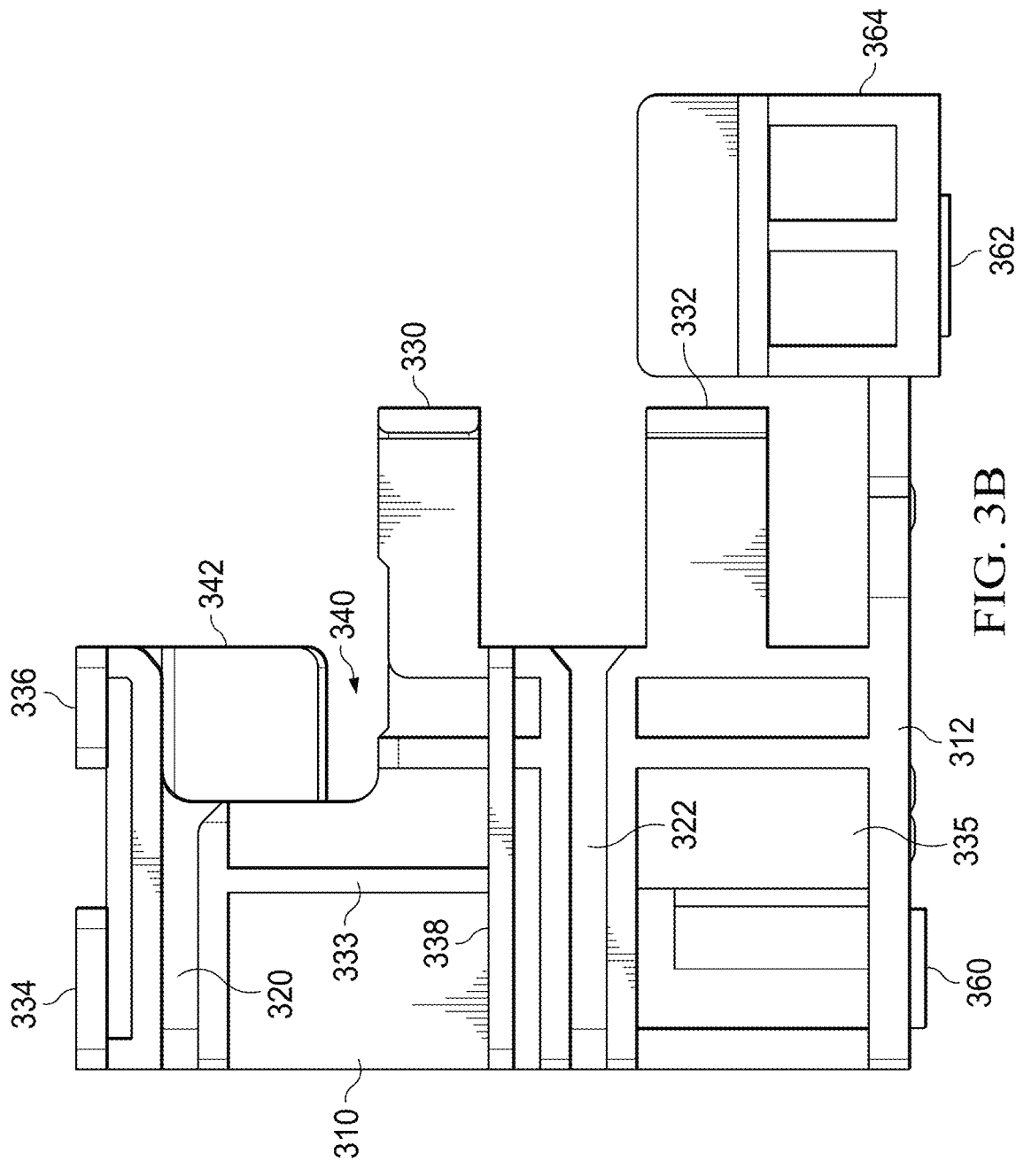
FIGS. 3B, 3C, 3D, 3E, 3F and 3G, generally referred to as FIG. 3, respectively show front, rear, top, bottom, right and left views of a card retention component in accordance with the present disclosure.
Figure 3C:
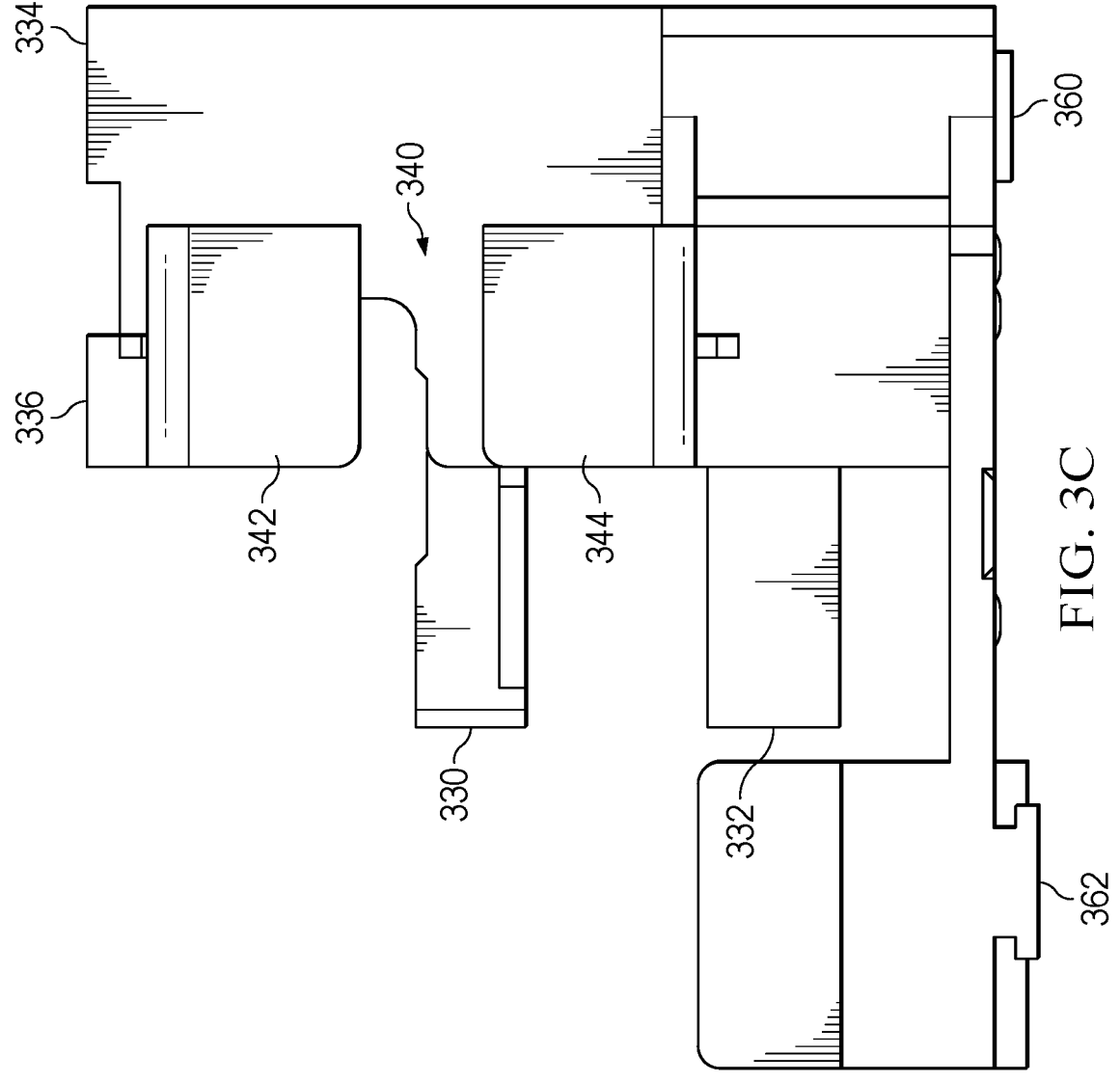
Figure 3D:
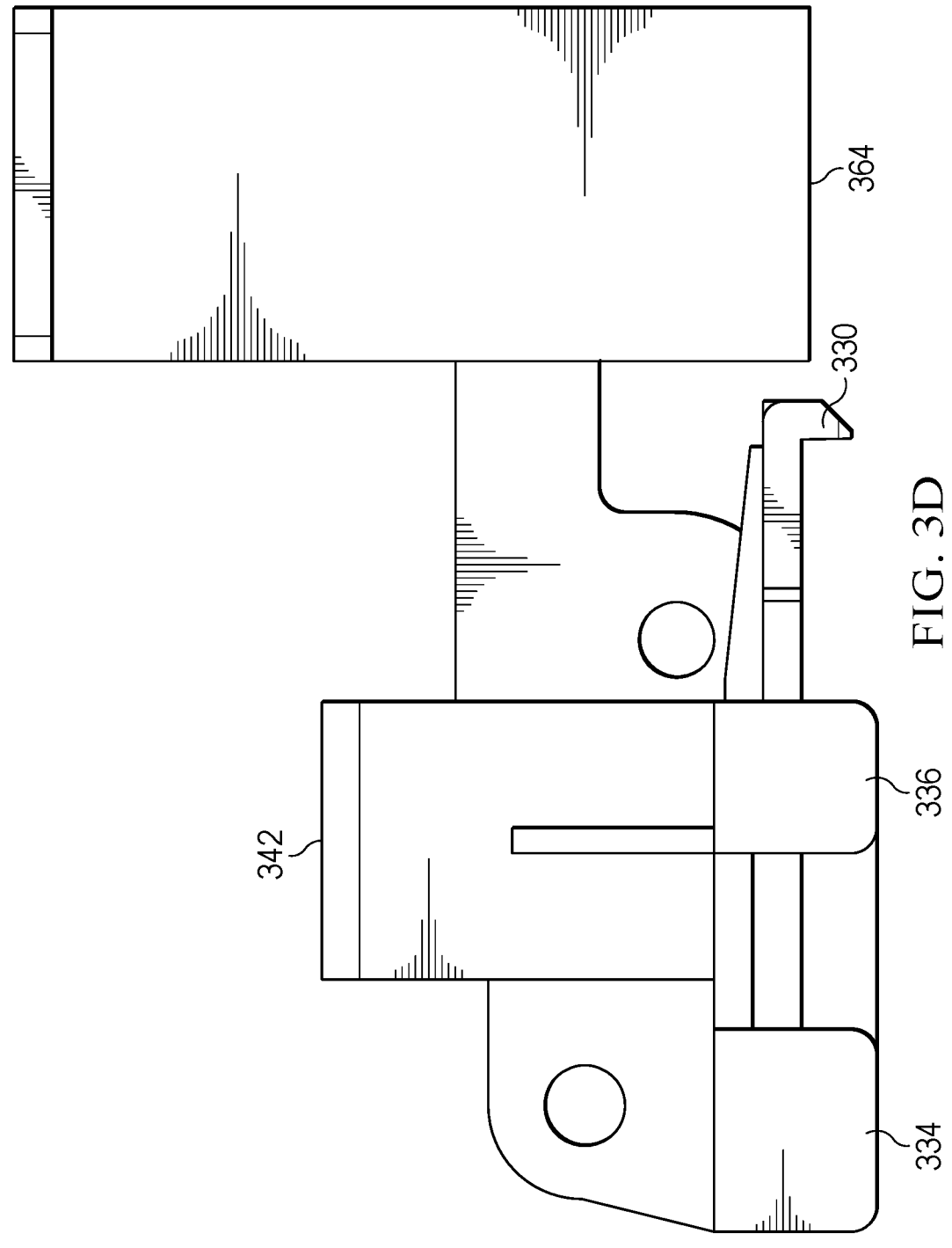
Figure 3E:
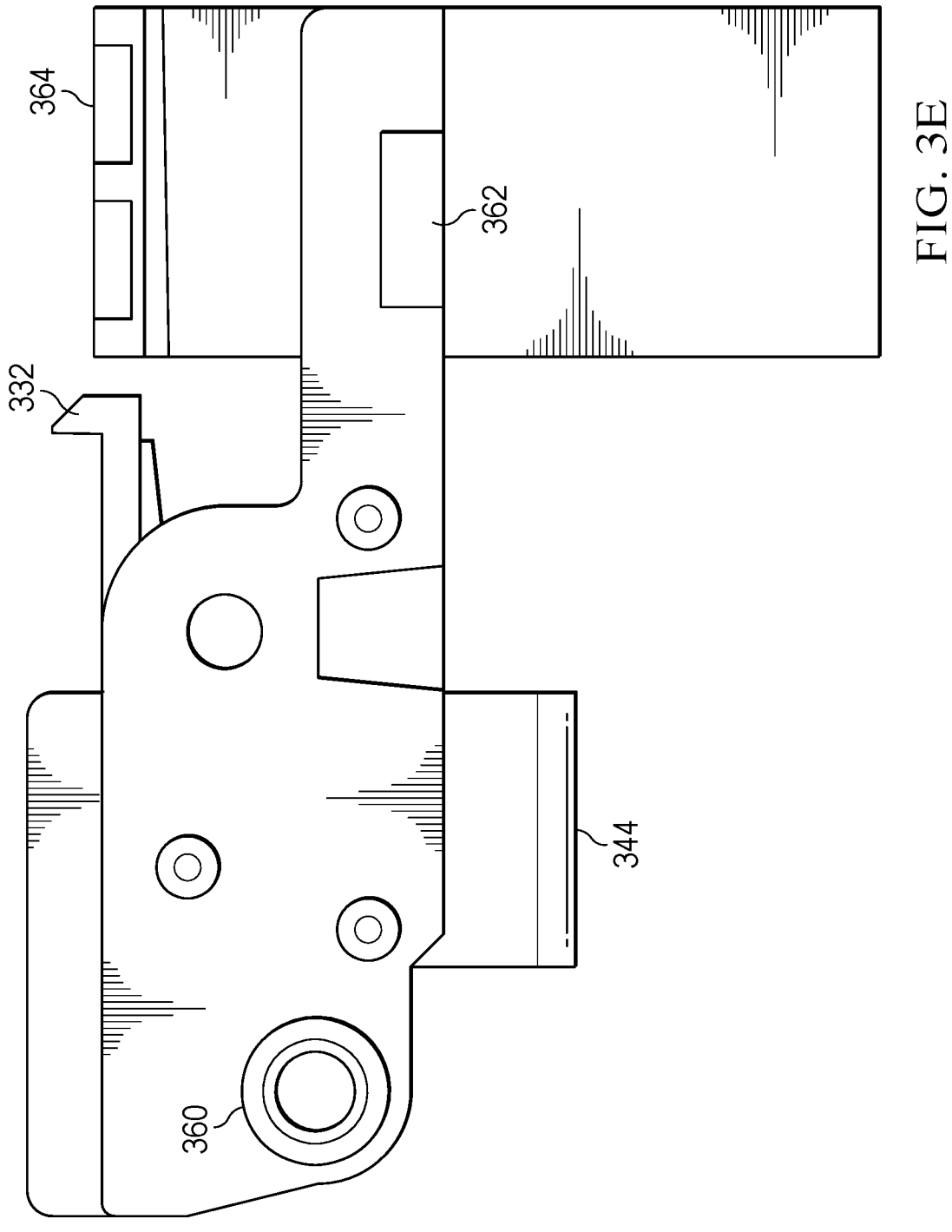
Figure 3F:
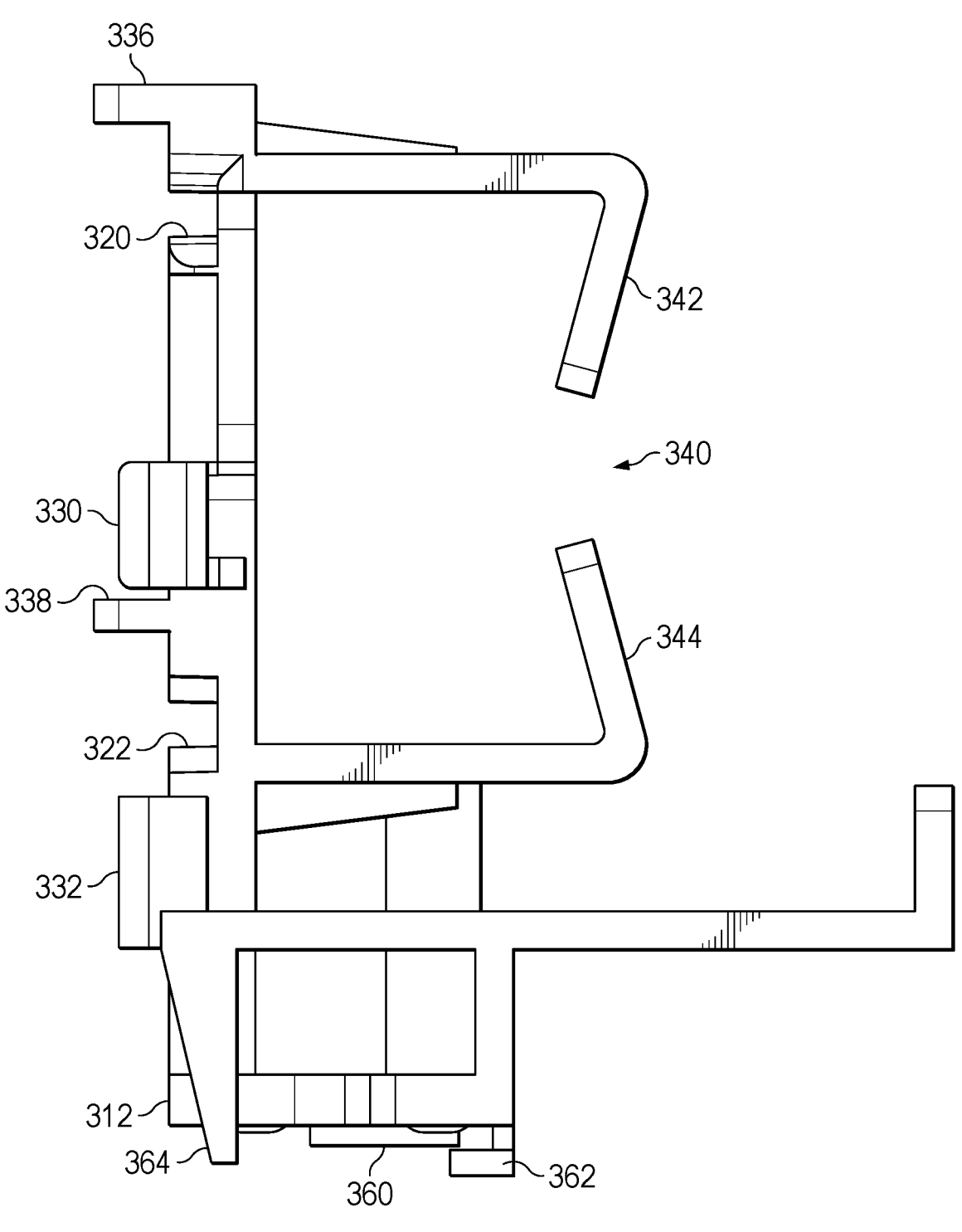
Figure 3G:
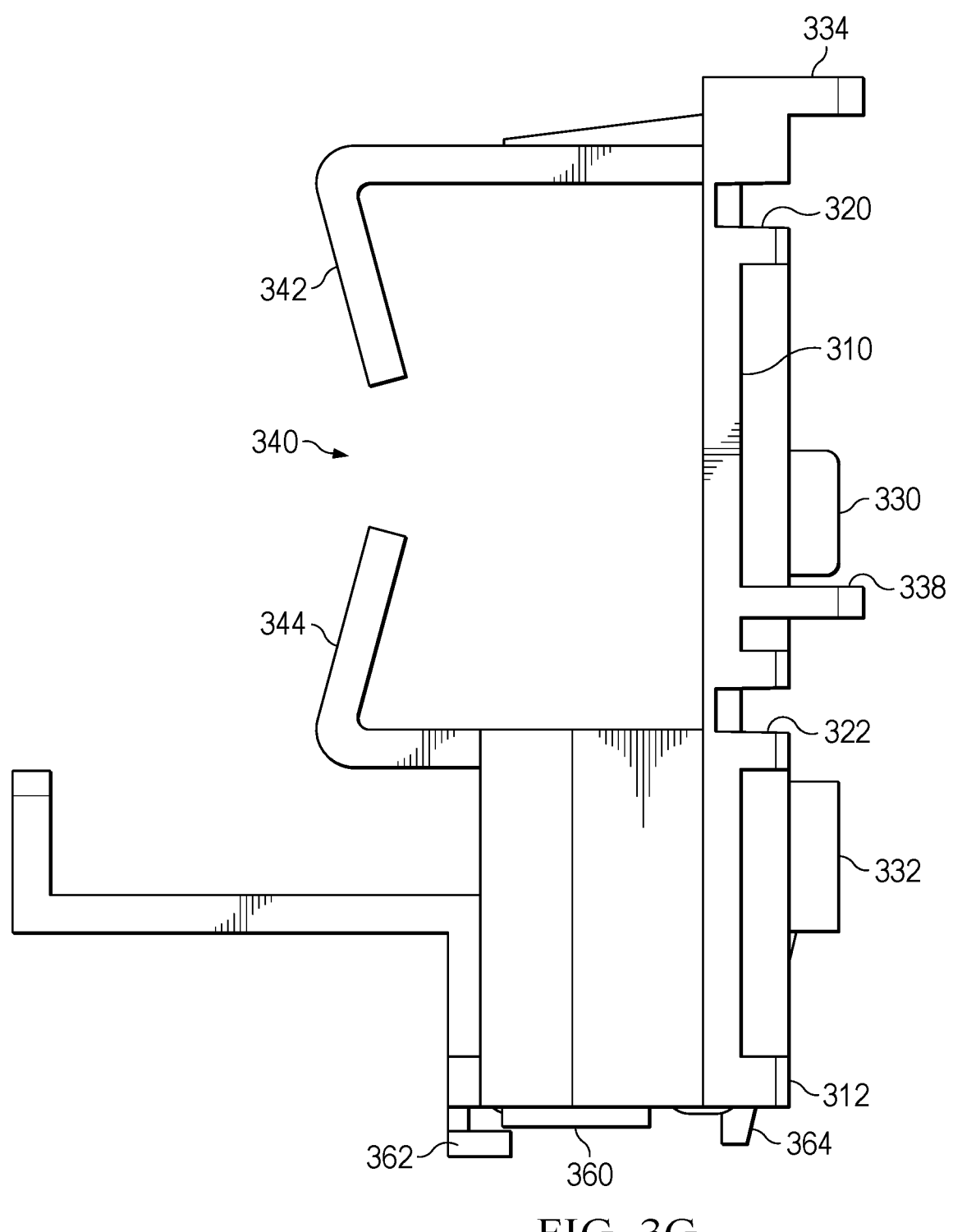
Figure 3H:
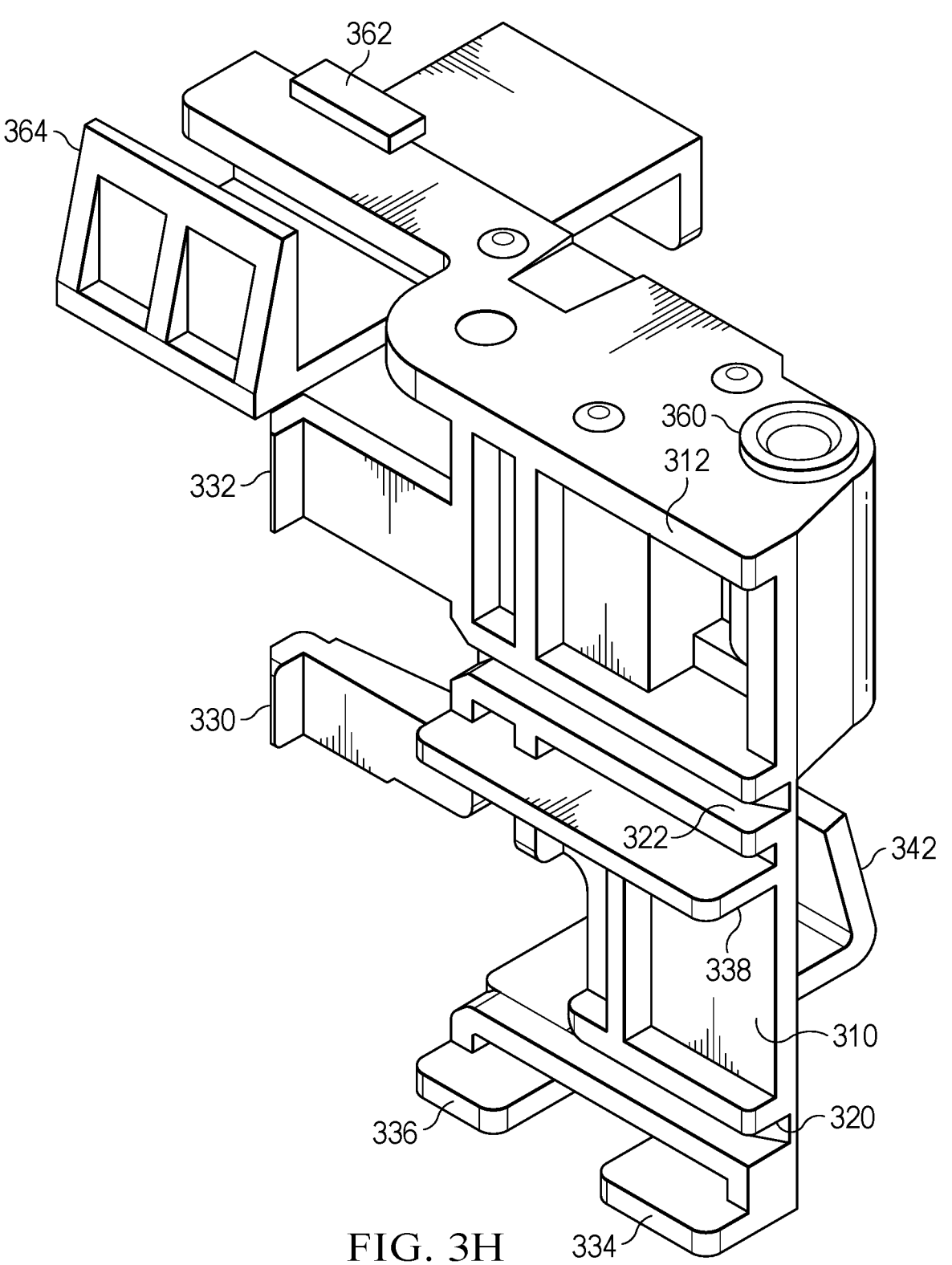
FIG. 3H, generally referred to as FIG. 3, shows a bottom side perspective view of a card retention component in accordance with the present disclosure.

FIG. 3A, generally referred to as FIG. 3, shows a top side perspective view of a card retention component 300. FIGS. 3B, 3C, 3D, 3E, 3F and 3G, generally referred to as FIG. 3, respectively show front, rear, top, bottom, right and left views of the card retention component 300. FIG. 3H, generally referred to as FIG. 3, shows a bottom side perspective view of the card retention component 300. In certain embodiments, the card retention component 300 corresponds to card mount component 220.

In certain embodiments, the information handling system card retention operation uses the card mount component 300 to retain information handling system cards 230, 240 conforming to a plurality of different card form factor within a single card bay 210. In certain embodiments, the different form factors include a peripheral component interconnect express (PCIe) form factor and a low profile graphics processing unit (GPU) form factor. In certain embodiments, an example low profile GPU form factor includes an A2 low profile GPU card available from NVIDIA. In certain embodiments, the card mount component 300 performs a card retention function, a cable management function, or a combination thereof. In certain embodiments, the card mount component 300 secures installed cards 230, 240 within the card holder to meet military and NEBS specification requirements. In certain embodiments, the card mount component 300 provides future support for additional low profile GPU form factors such as the L4 card form factor available from NVIDIA.

In certain embodiments, the card retention component 300 includes a substantially (i.e., +/−20%) vertical structural component 310, a substantially horizontal base component 312, or a combination thereof. In certain embodiments, the card retention component 300 includes one or more card retention features. In certain embodiments, the one or more card retention features include one or more slot features 320, 322, one or more side latch features 330, 332, one or more side wall features 333, 335, one or more top support structure features 334, 336, a support structure feature 338 a cable management feature 340, or a combination thereof. In certain embodiments, the cable management feature 340 includes a top cable guide 342, a bottom cable guide 344, or a combination thereof.

In certain embodiments, the one or more slot features 320, 322 hold a card edge of a first form factor card. In certain embodiments, the first form factor card comprises a PCIe card. In certain embodiments, the one or more slot features 320, 322 are spaced vertically along the vertical structural component 310. In certain embodiments, the one or more slot features 320, 322 extend substantially parallel with each other. In certain embodiments, the one or more slot features 320, 322 correspond to respective riser slots within a card bay. In certain embodiments, the one or more side wall features 333, 335 are configured to abut a wall of a card corresponding to a second form factor. In certain embodiments, the one or more side wall features 333, 335 are spaced vertically along the vertical structural component 310.

In certain embodiments, the one or more side latch features 330, 332 hold a second form factor card. In certain embodiments, the second form factor card comprises a low profile card. In certain embodiments, the low profile card comprises a low profile GPU card. In certain embodiments, the side latch features interact with a card cover of the second form factor card. In certain embodiments, the one or more side latch features 330, 332 provide horizontal pressure against the card conforming to the second form factor. In certain embodiments, the side latch features 330, 332, provide a secure connection between the low profile card and a card connector contained within the card bay. In certain embodiments, the side latch features 330, 332 perform a horizontal constraint function so secure the cards within the card bay in a horizontal direction. In certain embodiments, the one or more side latch features 330, 332 are spaced vertically along the vertical structural component 310. In certain embodiments, the one or more side latch features 330, 332 extend substantially parallel with each other. In certain embodiments, the one or more side latch features 330, 332 correspond to respective riser slots within a card bay.

In certain embodiments, the card retention component 300 is configured such as either of two form factors may be secured in either of two riser slots within the card bay. Accordingly, there is no limitation whether a card needs to be installed into a specific riser slot. The geometry of the card retention component allows either of two form factors to be secured using a single card retention component 300.

In certain embodiments, one or more top support structure features 334, 336 hold a low profile card in a top riser slot of the card bay. In certain embodiments, the support structure feature 338 holds a low profile card in a bottom riser slot of the card bay. In certain embodiments, the one or more top support structure features 336, 336, the support structure 338, or a combination thereof perform a vertical constraint function so secure the cards within the card bay in a vertical direction. In certain embodiments, the vertical constraint function applies a vertical pressure against the card when the card is mounted within one of the riser slots of the card bay.

In certain embodiments, the cable management feature 340 performs a cable management function. In certain embodiments, the top cable guide 342 includes a top cable guide angled portion. In certain embodiments, the bottom cable guide 344 includes a bottom cable guide angled portion. In certain embodiments, the cable management function guides cables coupled to a card mounted within a bottom riser slot, cables coupled to a card mounted within a top riser slot, or a combination of cables thereof, away from the card bay.

In certain embodiments, the card retention component 300 includes a mounting aperture 360 through which a pin can be mounted to rotatably attach the card retention component 300 to an inside wall of an information handling system chassis. In certain embodiments, the mounting aperture 360 and the pin allow the card retention component 300 to rotate between an open position and a closed position. In certain embodiments, the card retention component open position facilitates attachment of a card within the card bay. In certain embodiments, the card retention component closed position securely attaches a card within the card bay.

In certain embodiments, the card retention component 300 includes a card retention component rotation guide portion 362 and a card retention component positional securing portion 364. In certain embodiments, the rotation guide portion 362 provides a card retention component rotation function. In certain embodiments, the rotation function allows the card retention component 300 to rotate between an open position and a closed position. In certain embodiments, the card retention component open position facilitates attachment of a card within the card bay. In certain embodiments, the card retention component closed position securely attaches a card within the card bay. In certain embodiments, the positional securing portion 364 provides a card retention component securing function. In certain embodiments, the rotation function maintains the card retention component 300 a closed position until enough force is applied to dislodge the securing portion 364 from a retention aperture.

In certain embodiments, some or all of the features of the card retention component 300 are integrated in a single structure. As used herein, integrated broadly refers to being constructed or formed from a single piece of material. In certain embodiments, the card retention component 300 is formed from a single piece of plastic.

Figure 4:
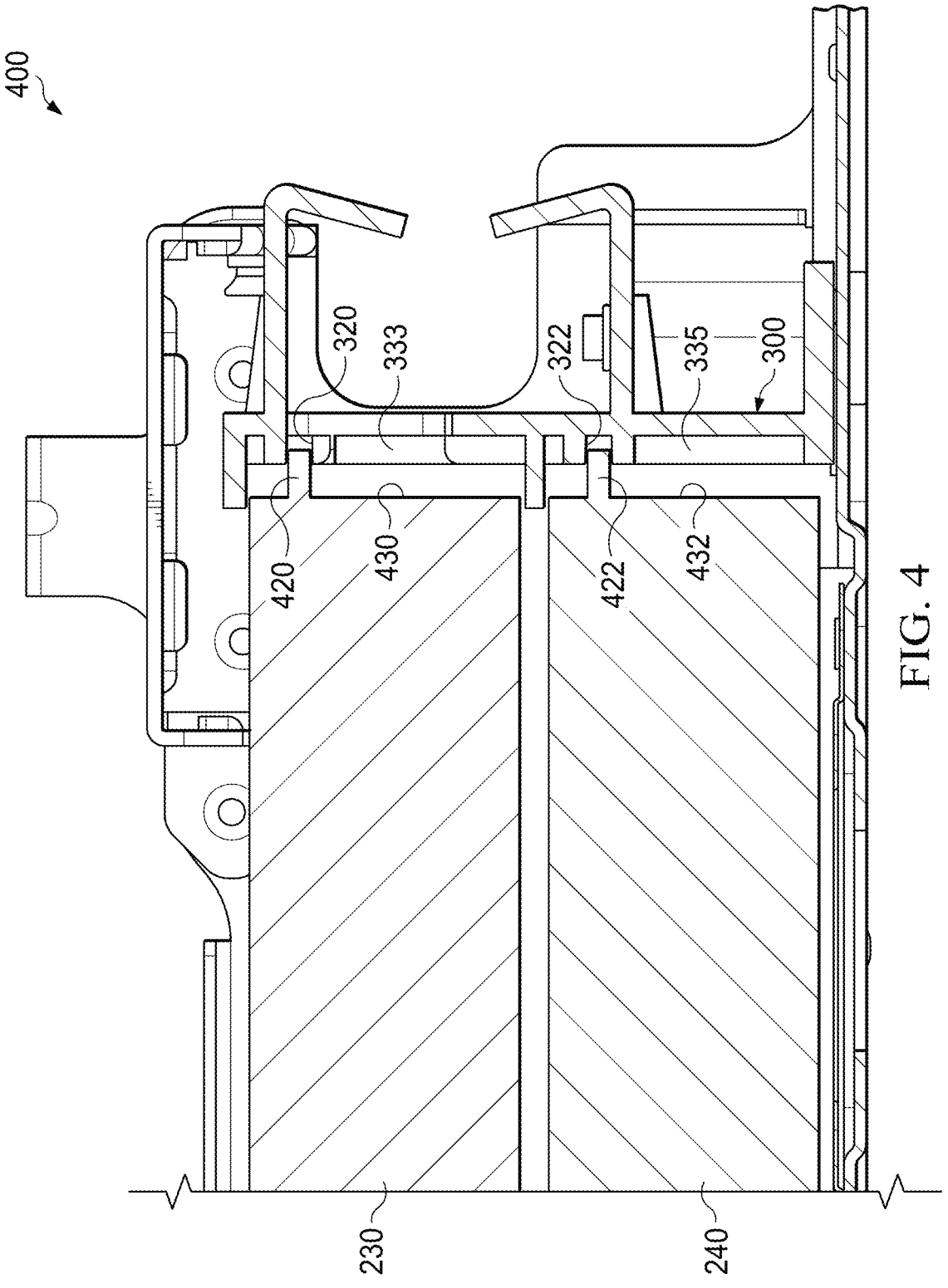
FIG. 4 shows a side view of a portion of a card mounting system in accordance with the present disclosure.

FIG. 4 shows a side view of a portion of a card mounting system 400. More specifically, the card retention component 300 defines a plurality of slots 320, 322 which are configured mate with projections 420, 422, respectively when cards conforming to a first form factor are mounted within the card bay. The card retention component 300 also includes side wall portions 333, 335 which are parallel with walls 430, 432 of respective cards conforming to a second form factor when the cards conforming to the second form factor are mounted within the card bay. In certain embodiments, the first form factor includes a peripheral component interconnect express (PCIe) form factor and the second form factor includes a low profile graphics processing unit (GPU) form factor. In certain embodiments, an example low profile GPU form factor includes an A2 low profile GPU card available from NVIDIA.

Figure 5:
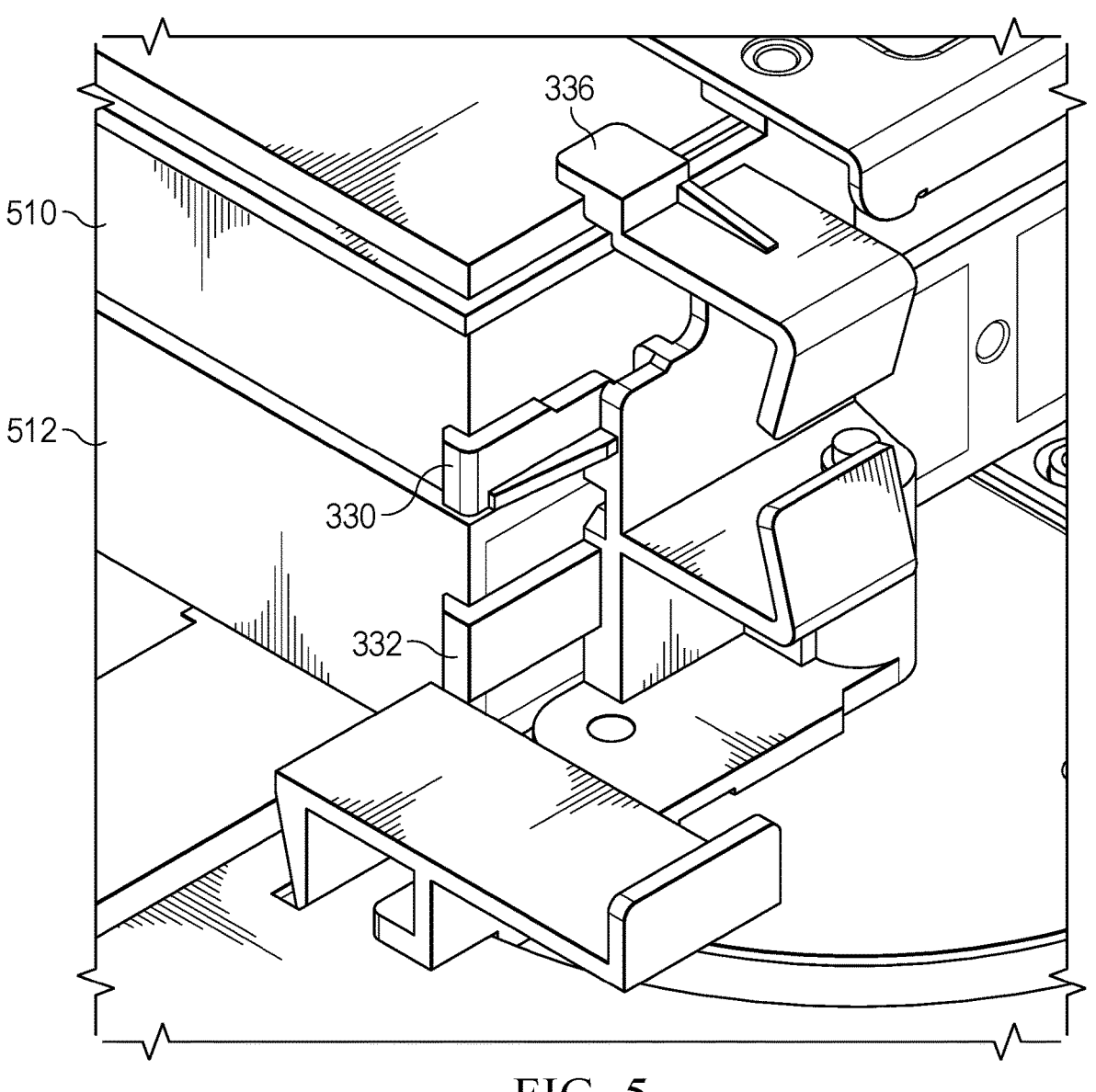
FIG. 5 shows a side perspective view of a portion of a card mounting system in accordance with the present disclosure.
Figure 6:
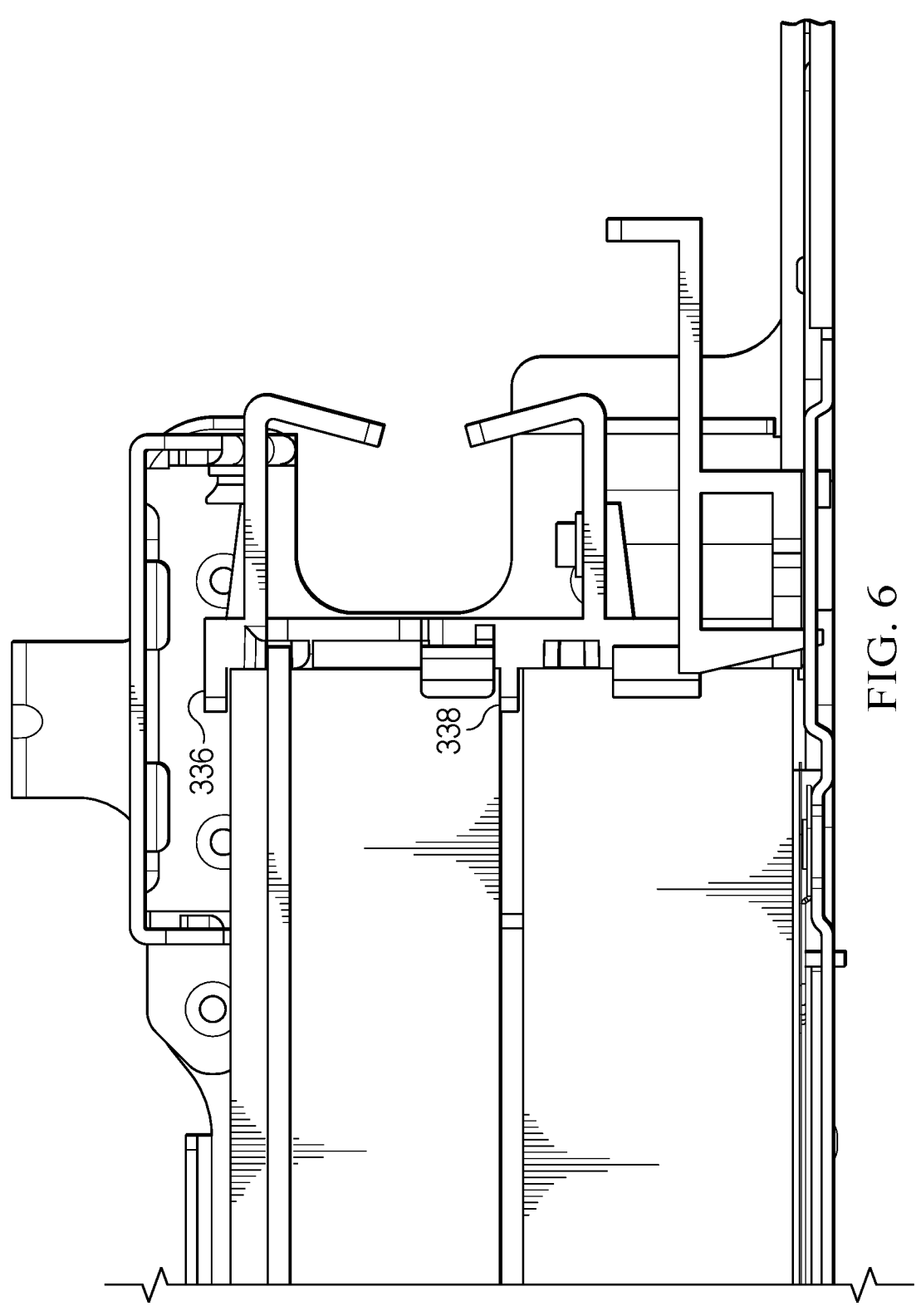
FIG. 6 shows a cut away side view of a card mounting system.

FIG. 5 shows a side perspective view of a portion of a card mounting system. FIG. 6 shows a cut away side view of a card mounting system.

In certain embodiments, one or mode side latch features 330, 332 hold respective card covers of cards corresponding to a second form factor. In certain embodiments, the second form factor card comprises a low profile card. In certain embodiments, the low profile card comprises a low profile GPU card. In certain embodiments, the side latch features 330, 332, provide a secure connection between the low profile card and a card connector contained within the card bay. In certain embodiments, the side latch features 330, 332 perform a horizontal constraint function so secure the cards within the card bay in a horizontal direction. In certain embodiments, the one or more side latch features 330, 332 are spaced vertically along the vertical structural component 310. In certain embodiments, the one or more side latch features 330, 332 extend substantially parallel with each other. In certain embodiments, the one or more side latch features 330, 332 correspond to respective riser slots within a card bay.

In certain embodiments, one or more top support structure features 334, 336 hold a low profile card 510 in a top riser slot of the card bay. In certain embodiments, the support structure feature 338 holds a low profile card 512 in a bottom riser slot of the card bay. In certain embodiments, the one or more top support structure features 336, 336, the support structure 338, or a combination thereof perform a vertical constraint function so secure the cards within the card bay in a vertical direction.

Figure 7:
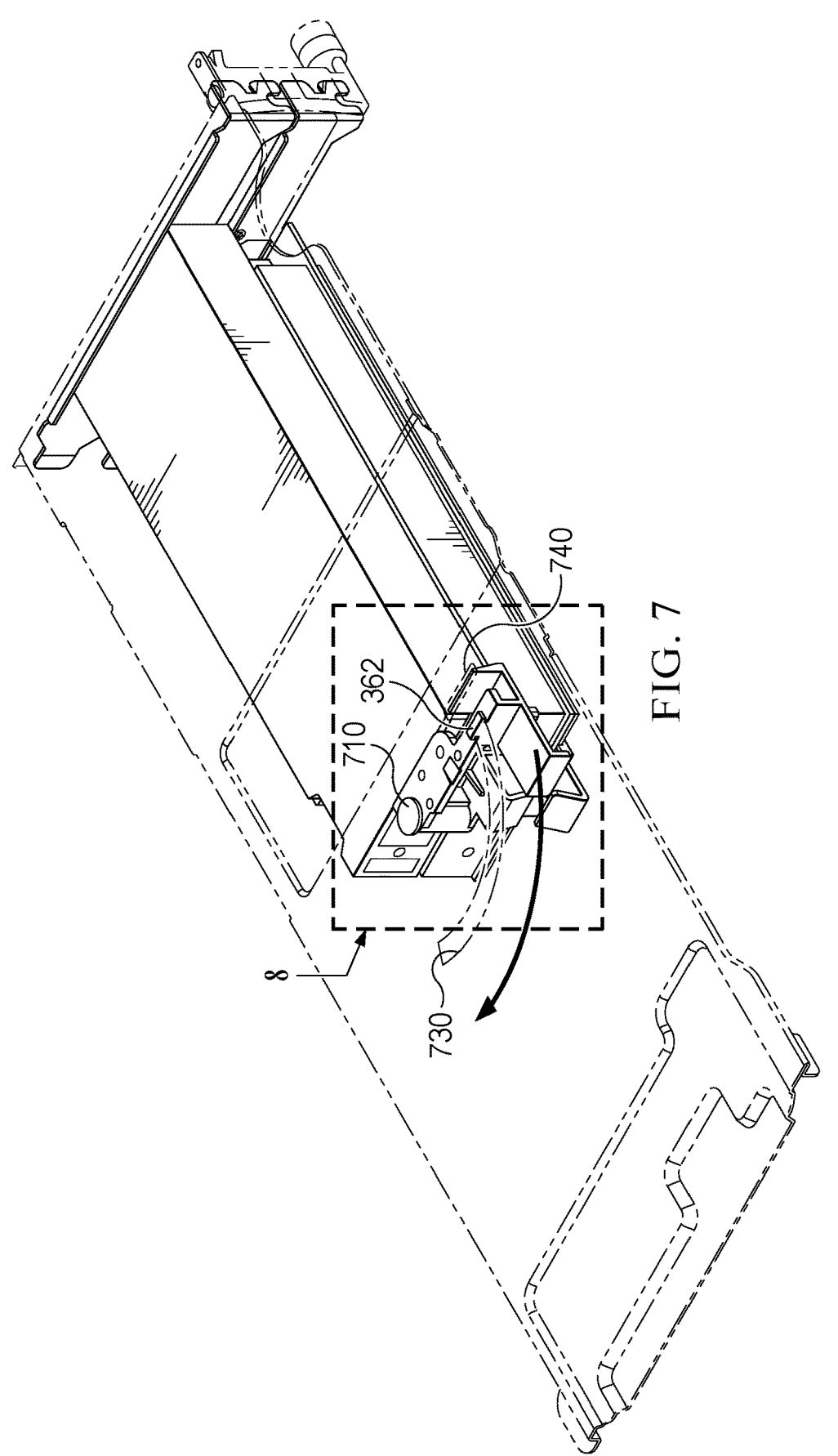
FIG. 7 shows a bottom perspective view of a portion of an information handling system with a card mounting system in accordance with the present disclosure.
Figure 8:
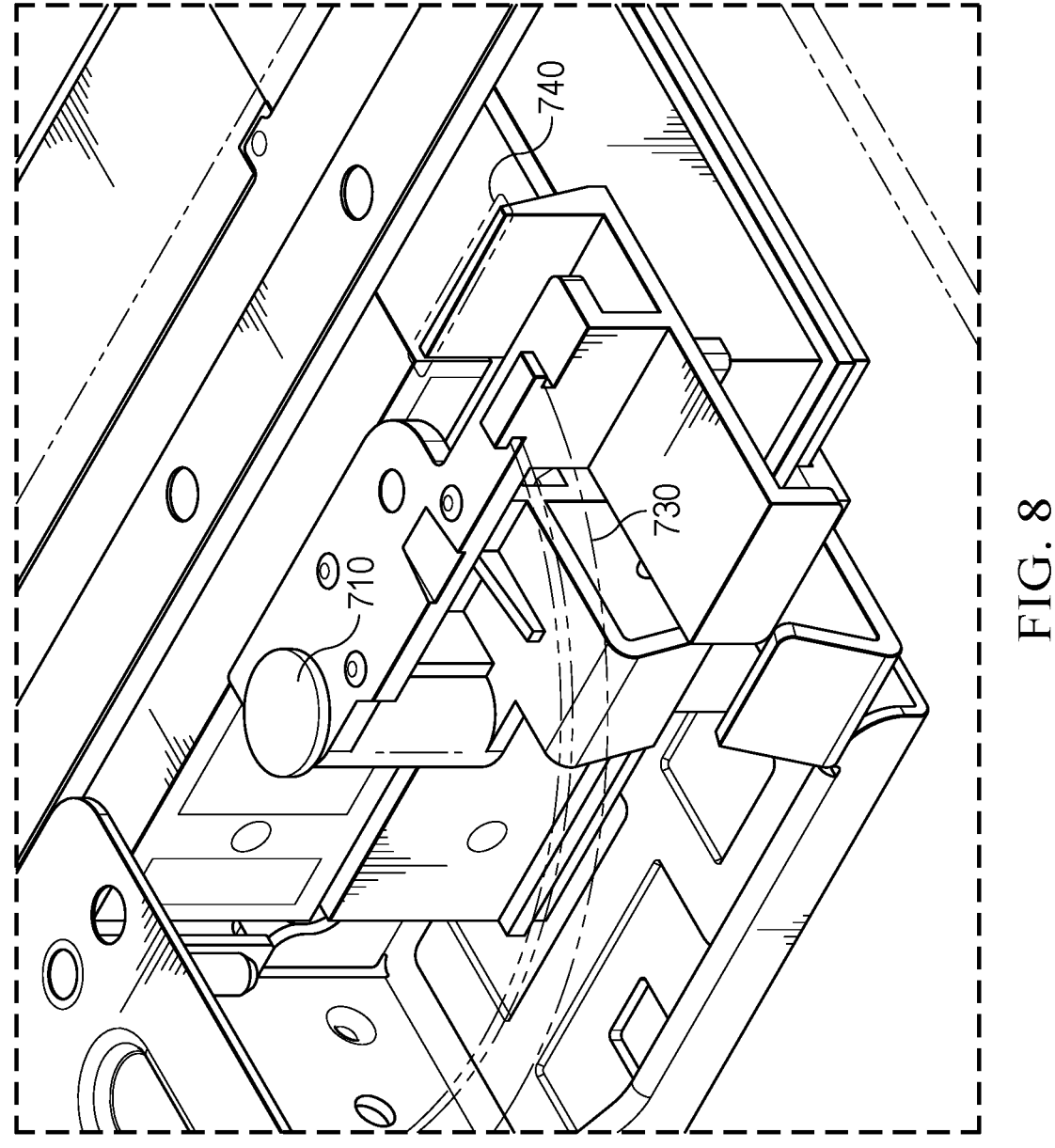
FIG. 8 shows a cut away bottom perspective view of a portion of an information handling system with a card retention component in accordance with the present disclosure.
Figure 9A:
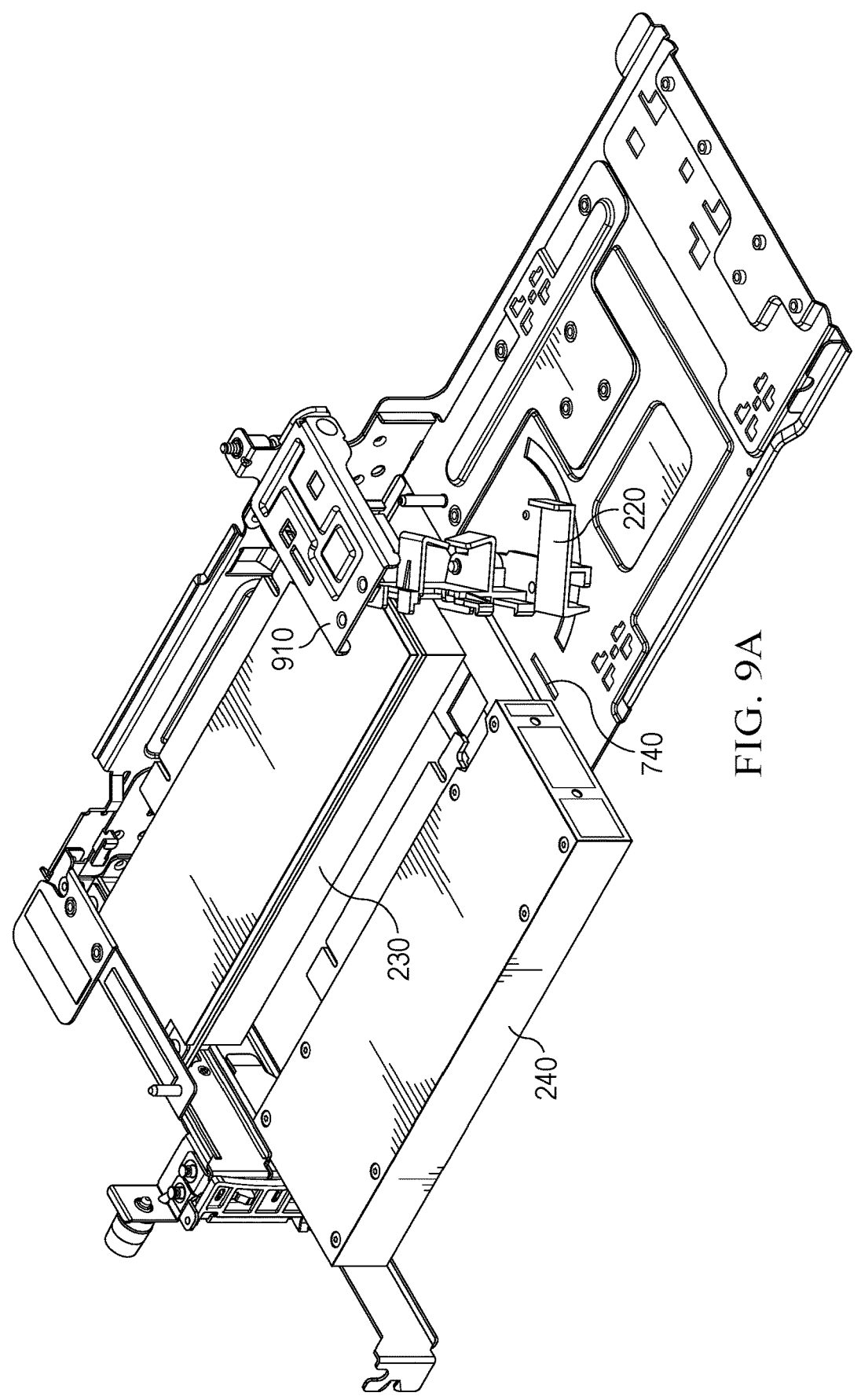
FIGS. 9A and 9B, generally referred to as FIG. 9, show perspective views of a portion of an information handling system with a card mounting system in accordance with the present disclosure.
Figure 9B:
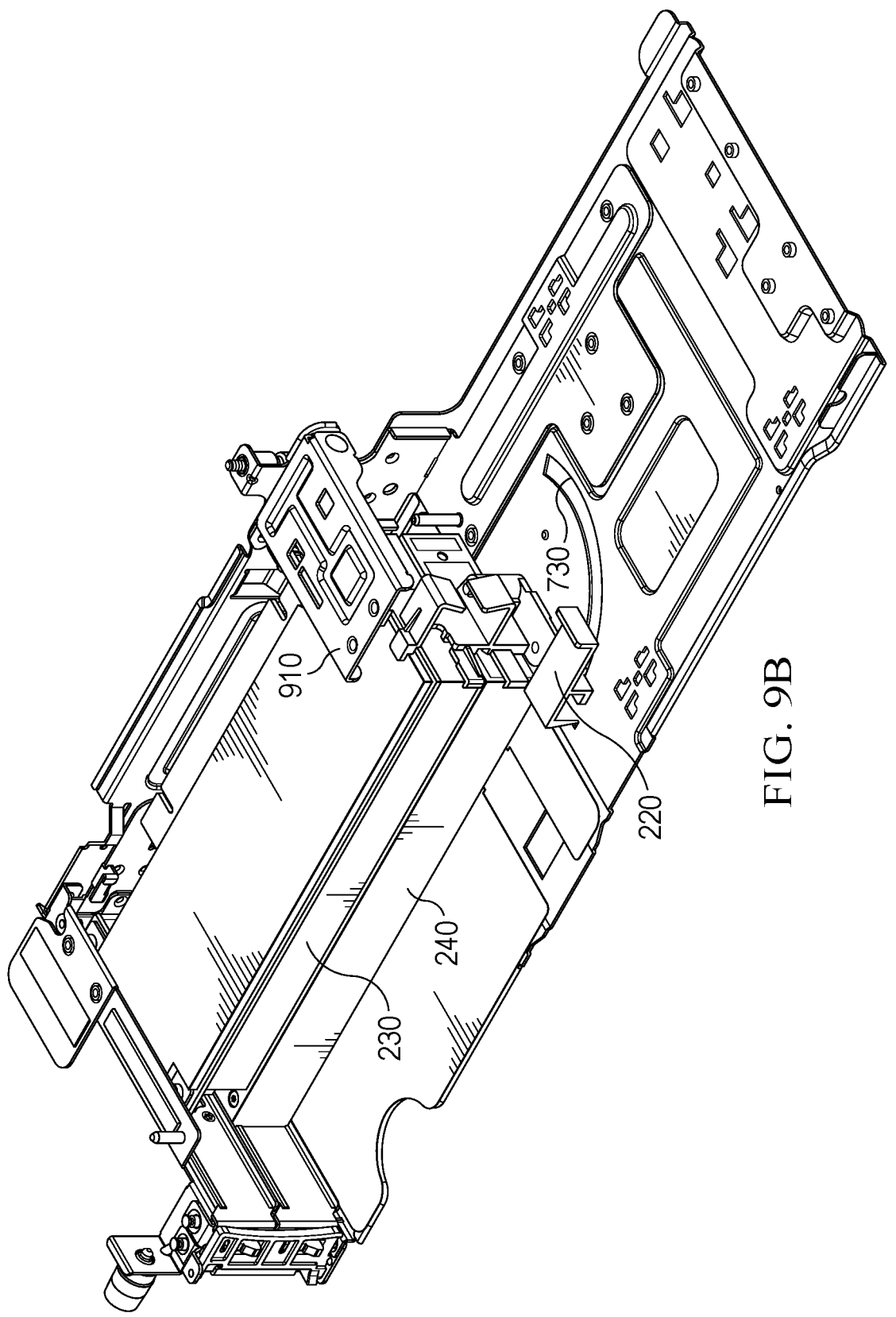

FIG. 7 shows a bottom perspective view of a portion of an information handling system with a card mounting system. FIG. 8 shows a cut away bottom perspective view of a portion of an information handling system with a card retention component. FIGS. 9A and 9B, generally referred to as FIG. 9, show perspective views of a portion of an information handling system with a card mounting system in accordance with the present disclosure.

In certain embodiments, the card retention component 300 includes a mounting aperture 360 through which a pin 710 can be mounted to rotatably attach the card retention component 300 to an inside wall of an information handling system chassis. In certain embodiments, the mounting aperture 360 and the pin 710 allow the card retention component 300 to rotate between an open position and a closed position. In certain embodiments, the card retention component open position facilitates attachment of a card within the card bay. In certain embodiments, the card retention component closed position securely attaches a card 230, 240 within the card bay.

In certain embodiments, the card retention component 300 includes a card retention component rotation guide portion 362 and a card retention component positional securing portion 364. In certain embodiments, the card holder of the card mounting system includes a bottom wall. In certain embodiments, the bottom wall defines a rotation aperture 730 and a retention aperture 740. In certain embodiments, the rotation aperture 730 is arc shaped. In certain embodiments, the rotation guide portion 360 mates with the rotation aperture 730. In certain embodiments, the rotation guide portion 362 and the rotation aperture 730 provide a card retention component rotation function. In certain embodiments, the rotation function allows the card retention component 300 to rotate between an open position and a closed position. In certain embodiments, the card retention component open position facilitates attachment of a card within the card bay. In certain embodiments, the card retention component closed position securely attaches a card 230, 240 within the card bay. In certain embodiments, the card retention component positional securing portion 364 mates with the retention aperture 740. In certain embodiments, the positional securing portion 364 and the retention aperture 730 provide a card retention component securing function. In certain embodiments, the rotation function maintains the card retention component 300 a closed position until enough force is applied to dislodge the securing portion 364 from the retention aperture 740.

In certain embodiments, the card bay includes a top wall portion 910. In certain embodiments, the card retention component is mounted between the bottom wall and the top wall portion.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A card retention component, comprising:
a vertical structural component;
a slot feature coupled with the vertical structural component, the slot feature being configured to mate with a projection extending from a card conforming to a first card form factor; and
a side latch feature coupled with the vertical structural component, the side latch feature being configured to provide horizontal pressure against a card conforming to a second card form factor, the side latch feature extending from a rear edge of the vertical structural component, the side latch feature including a horizontal portion and a latch portion, the horizontal portion extending from the rear edge of the vertical structural component, the latch portion extending from the horizontal portion to provide the horizontal pressure; and wherein
the slot feature and the side latch feature enable the card retention component to retain cards conforming to the plurality of different card form factors within a single card bay;
first and second cards are attached within the single card bay one on top of another; and,
the card retention component retains the first and second cards within the single card bay.

2. The card retention component of claim 1, wherein:
the vertical structural component, the slot feature and the side latch feature are integrated in a single structure.

3. The card retention component of claim 1, further comprising:
a cable management feature, the cable management feature performing a cable management function, the cable management feature extending from a rear side of the vertical structural component.

4. The card retention component of claim 1, further comprising:
a top support structure feature, the top support structure feature applying vertical pressure against a card mounted within the single card bay.

5. The card retention component of claim 1, further comprising:

a rotation guide portion, the rotation guide portion providing a card retention component rotation function, the rotation function allowing the card retention component to rotate between an open position and a closed position, the rotation guide portion interacting with an arc shaped rotation aperture located on a bottom wall of the single card bay; and
a positional securing portion, the positional securing portion providing a securing function, the securing function maintaining the card retention component in the closed position until enough force is applied to dislodge the positional securing portion from a retention aperture, the positional securing portion mating with a retention aperture located on the bottom wall of the single card bay when the card retention component is in the closed position.

6. The card retention component of claim 1, wherein:
the first form factor includes a peripheral component interconnect express (PCIe) form factor and the second form factor includes a low profile graphics processing unit (GPU) form factor.

7. A card mounting system, comprising:
a card bay; and,
a card retention component coupled to the card bay, the card retention component comprising
a vertical structural component;
a slot feature coupled with the vertical structural component, the slot feature being configured to mate with a projection extending from a card conforming to a first card form factor; and
a side latch feature coupled with the vertical structural component, the side latch feature being configured to provide horizontal pressure against a card conforming to a second card form factor, the side latch feature extending from a rear edge of the vertical structural component, the side latch feature including a horizontal portion and a latch portion, the horizontal portion extending from the rear edge of the vertical structural component, the latch portion extending from the horizontal portion to provide the horizontal pressure; and wherein
the slot feature and the side latch feature enable the card retention component to retain cards conforming to the plurality of different card form factors within the card bay;
first and second cards are attached within the single card bay one on top of another; and,
the card retention component retains the first and second cards within the single card bay.

8. The card mounting system of claim 7, wherein:
the vertical structural component, the slot feature and the side latch feature are integrated in a single structure.

9. The card mounting system of claim 7, wherein the card retention component further comprises:
a cable management feature, the cable management feature performing a cable management function, the cable management feature extending from a rear side of the vertical structural component.

10. The card mounting system of claim 7, wherein the card retention component further comprises:
a top support structure feature, the top support structure feature applying vertical pressure against a card mounted within the card bay.

11. The card mounting system of claim 7, wherein the card retention component further comprises:
a rotation guide portion, the rotation guide portion providing a card retention component rotation function, the rotation function allowing the card retention component to rotate between an open position and a closed position, the rotation guide portion interacting with an arc shaped rotation aperture located on a bottom wall of the single card bay; and a positional securing portion, the positional securing portion providing a securing function, the securing function maintaining the card retention component in the closed position until enough force is applied to dislodge the positional securing portion from a retention aperture, the positional securing portion mating with a retention aperture located on the bottom wall of the single card bay when the card retention component is in the closed position.

12. The card mounting system of claim 7, wherein:

the first form factor includes a peripheral component interconnect express (PCIe) form factor and the second form factor includes a low profile graphics processing unit (GPU) form factor.

13. A system comprising:

a processor;

a data bus coupled to the processor; and a card mounting system, the card mounting system comprising a card bay and a card retention component coupled to the card bay, the card retention component comprising a vertical structural component;

a slot feature coupled with the vertical structural component, the slot feature being configured to mate with a projection extending from a card conforming to a first card form factor; and a side latch feature coupled with the vertical structural component, the side latch feature being configured to provide horizontal pressure against a card conforming to a second card form factor, the side latch feature extending from a rear edge of the vertical structural component, the side latch feature including a horizontal portion and a latch portion, the horizontal portion extending from the rear edge of the vertical structural component, the latch portion extending from the horizontal portion to provide the horizontal pressure; and wherein the slot feature and the side latch feature enable the card retention component to retain cards conforming to the plurality of different card form factors within the card bay;

first and second cards are attached within the single card bay one on top of another; and, the card retention component retains the first and second cards within the single card bay.

14. The system of claim 13, wherein:

the vertical structural component, the slot feature and the side latch feature are integrated in a single structure.

15. The system of claim 13, wherein the card retention component further comprises:

a cable management feature, the cable management feature performing a cable management function, the cable management feature extending from a rear side of the vertical structural component.

16. The system of claim 13, wherein the card retention component further comprises:

a top support structure feature, the top support structure feature applying vertical pressure against a card mounted within the card bay.

17. The system of claim 13, wherein the card retention component further comprises:

a rotation guide portion, the rotation guide portion providing a card retention component rotation function, the rotation function allowing the card retention component to rotate between an open position and a closed position, the rotation guide portion interacting with an arc shaped rotation aperture located on a bottom wall of the single card bay; and a positional securing portion, the positional securing portion providing a securing function, the securing function maintaining the card retention component in the closed position until enough force is applied to dislodge the positional securing portion from a retention aperture, the positional securing portion mating with a retention aperture located on the bottom wall of the single card bay when the card retention component is in the closed position.

18. The system of claim 13, wherein:

the first form factor includes a peripheral component interconnect express (PCIe) form factor and the second form factor includes a low profile graphics processing unit (GPU) form factor.

\* \* \* \* \*